US009259859B2

(12) United States Patent
Blackburn et al.

(10) Patent No.: US 9,259,859 B2
(45) Date of Patent: Feb. 16, 2016

(54) METHOD FOR FORMING SHAPED PREFORM

(71) Applicant: Cytec Industries Inc., Woodland Park, NJ (US)

(72) Inventors: Robert Blackburn, Hull (GB); James Eastbury, Wrexham (GB); Samuel Hill, Wrexham (GB)

(73) Assignee: Cytec Industries Inc., Woodland Park, NJ (US)

( * ) Notice: Subject to any disclaimer, the term of this patent is extended or adjusted under 35 U.S.C. 154(b) by 130 days.

(21) Appl. No.: 14/133,954

(22) Filed: Dec. 19, 2013

(65) Prior Publication Data

US 2014/0175709 A1   Jun. 26, 2014

(30) Foreign Application Priority Data

Dec. 20, 2012   (GB) .................................. 1223032.2

(51) Int. Cl.
| | |
|---|---|
| *B29B 11/16* | (2006.01) |
| *B29C 70/44* | (2006.01) |
| *B29C 70/54* | (2006.01) |
| *B29C 51/10* | (2006.01) |
| *B29C 51/14* | (2006.01) |

(52) U.S. Cl.
CPC ................ *B29B 11/16* (2013.01); *B29C 51/10* (2013.01); *B29C 51/145* (2013.01); *B29C 70/44* (2013.01); *B29C 70/542* (2013.01)

(58) Field of Classification Search
None
See application file for complete search history.

(56) References Cited

U.S. PATENT DOCUMENTS

| | | | | | |
|---|---|---|---|---|---|
| 4,065,340 | A | * | 12/1977 | Dickerson | ...................... 156/154 |
| 5,037,599 | A | * | 8/1991 | Olson | ........................... 264/510 |
| 5,578,158 | A | * | 11/1996 | Gutowski et al. | ............. 156/285 |
| 5,817,265 | A | | 10/1998 | Gendreau | |
| 7,862,322 | B2 | | 1/2011 | Okoli et al. | |
| 2004/0157519 | A1 | * | 8/2004 | Goodell et al. | ................ 442/181 |
| 2005/0008862 | A1 | | 1/2005 | Joseph et al. | |

FOREIGN PATENT DOCUMENTS

| | | |
|---|---|---|
| EP | 0410599 A2 | 1/1991 |
| GB | 2452298 A | 3/2009 |
| WO | 0202299 A1 | 1/2002 |
| WO | 2011/039484 | 4/2011 |

OTHER PUBLICATIONS

International Search Report. PCT/US2013/076378. Apr. 10, 2014.

* cited by examiner

*Primary Examiner* — Monica Huson
(74) *Attorney, Agent, or Firm* — Thi D. Dang

(57) ABSTRACT

A method for shaping dry preform material prior to resin infusion is disclosed. The starting material to be shaped is a preform blank (e.g. flat sheet) of dry, fibrous material. The shaping process is a vacuum forming process that relies on controlling the vacuum pressure and deformation speed to produce a shaped preform with three-dimensional configuration. The purpose of the shaping process described herein is to enable an automated process to replace the conventional hand lay-up operation.

15 Claims, 4 Drawing Sheets

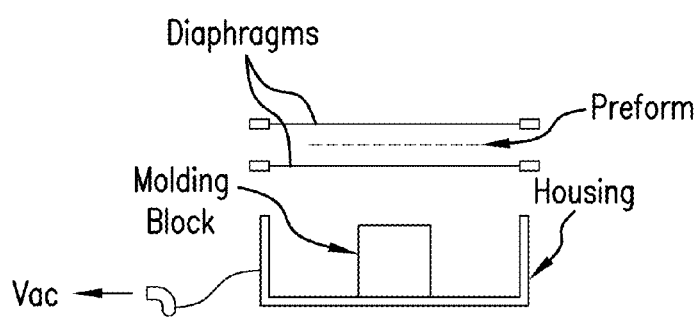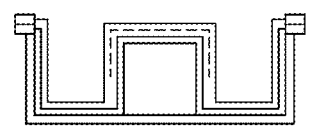
FIG.1A  FIG.1C
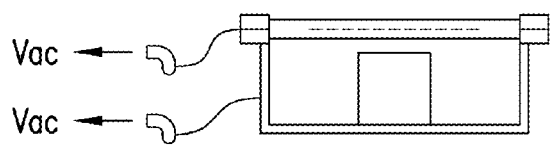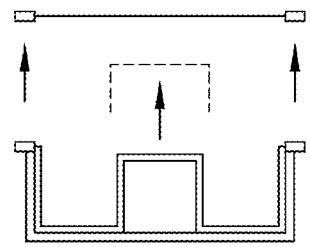
FIG.1B  FIG.1D

METHOD FOR FORMING SHAPED PREFORM

CROSS-REFERENCE TO RELATED APPLICATIONS

This application claims the benefit of prior United Kingdom Patent Application No. 1223032.2, filed on 20 Dec. 2012, which is incorporated herein in its entirety.

BACKGROUND

In recent years, the use of fiber-reinforced polymer composite materials has become more prevalent in industries such as aerospace and automotive. These composite materials exhibit high strength as well as corrosion resistant properties in harsh environment. In addition, their light-weight property is particularly advantageous when compared to similar parts constructed from metals.

Fiber-reinforced polymer composites have been traditionally made from prepregs, which are formed of fibres impregnated with a curable matrix resin, such as epoxy. The resin content in the prepreg is relatively high, typically 20%-50% by weight. Multiple plies of prepregs may be cut to size for laying up, then subsequently assembled and shaped in a molding tool. In the case where the prepreg cannot be easily adapted to the shape of the molding tool, heating may be applied to the prepregs in order to gradually deform it to the shape of the molding surface.

More recently, fiber-reinforced polymer composites are made by utilizing liquid molding processes that involve resin infusion technologies, which include Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process), Single Line Injection (SLI) and Constant Pressure Infusion (CPI) amongst others. In a resin infusion process, dry bindered fibers are first arranged in a mold as a preform and then injected or infused directly in-situ with liquid matrix resin. The term "bindered" as used herein means that a binder has been applied. The preform typically consists of one or more layers (i.e., plies) of dry, fibrous material that are assembled in a stacking arrangement where typically a powder, veil or film binder is utilized to maintain the desired geometry prior to resin infusion. After resin infusion, the resin-infused preform is cured according to a curing cycle to provide a finished composite article. Resin infusion is used not only to manufacture small, complex-shaped parts but it is also now used to manufacture large parts of aircrafts such as the entire wing.

In resin infusion, the fabrication of the preform to be infused with resin is a critical element—the preform is in essence the structural part awaiting resin. Hand layup has typically been used in the past to create composite preforms with detailed geometries. However, this is considered a time consuming operation with high risk of part-to-part variation. Thus, there remains a need for improvements in the fabrication of dry fibrous preforms for subsequent resin infusion.

SUMMARY

The present disclosure is related to the shaping of dry preform material prior to resin infusion. The starting material to be shaped is a preform blank (e.g. flat sheet) of dry, bindered, fibrous material. The shaping process is a vacuum forming process that relies on controlling the vacuum pressure and deformation speed to produce a shaped preform with three-dimensional configuration. The purpose of the shaping process described herein is to enable a highly controlled process to replace the conventional hand lay-up operation.

BRIEF DESCRIPTION OF THE DRAWINGS

FIGS. 1A-1D illustrates a vacuum forming process for shaping a flat preform according to one embodiment.

DETAILED DESCRIPTION

Figure 2C:
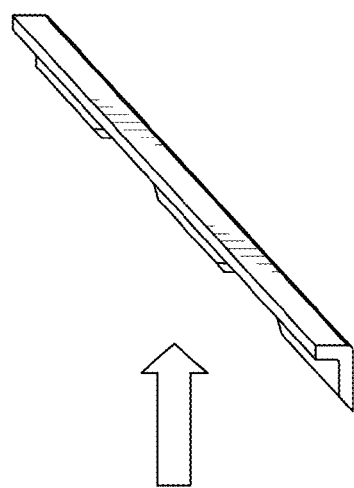
FIGS. 2A-2C illustrates a method of fabricating a shaped preform with an intermediate machining step.

The preform blank to be shaped is a flat sheet composed of a plurality of fibrous layers (or plies) assembled in a stacking arrangement. The fibrous layers of the preform are held in place (i.e., "stabilized") by bonding using a binder to maintain the alignment and to stabilize the fibrous layers. By having the binder, fraying or pulling apart of the dry fiber material can be prevented during storage, transport and handling. Furthermore, the injection or infusion of matrix resin may require pressurized injection, which may result in local displacement of fibers or an unstabilized preform. Thus, the binder holds the fibers in position during such pressurized injection.

The term "stabilization" or "stabilized" is used herein to mean the stabilization of multiple sheets, layers or plies of fibrous layers or fabrics so that they can be shaped or deformed without fraying, unraveling, pulling apart, buckling, wrinkling or otherwise reducing the integrity of the fibrous layers or fabrics.

Vacuum Forming Process

The vacuum forming process involves a double-diaphragm set-up, which includes an upper diaphragm and a lower diaphragm, which are to be placed over a tool housing (see FIG. 1A). The tooling chamber contains a single (shown) or multiple molds with a 3-dimensional, nonplanar surface representing the desired shape of the final structure. In addition, the tool housing is connected to a vacuum source via a vacuuming device (e.g. vacuum pump). The diaphragms are flexible and may be either elastic or non-elastically deformable sheets of material such as rubber, silicone, nylon or of a similar material that has an elongation to failure of above 100%. As an initial step, a flat preform is placed between the flexible sheets. Each diaphragm is attached to a frame to maintain the desired diaphragm shape through a supported perimeter.

The diaphragms with the preform there between are then placed on the tool housing (FIG. 1B). The diaphragm frames are sealed to the tool housing through a mechanical clamping mechanism so as to create an air-tight, sealed chamber bounded by the lower diaphragm and the tool housing, and to define a sealed pocket between the diaphragms. The sealed pocket between the diaphragms is connected to a suitable vacuuming means through a valve connection. Next, the sealed cavity between the diaphragms is partially evacuated to remove air. At this stage, the preform is firmly held between the diaphragms.

The vacuum pressure between the diaphragms is applied to achieve stability for the fibrous plies in the preform, to ensure consolidation between plies, and to avoid adverse deformation or wrinkling of fibrous material during shaping. Furthermore, the level of vacuum between the diaphragms is selectively applied in order to achieve controlled inter-ply shearing of fibrous material while maintaining appropriate preform stability. Stabilization of the preform is important in order to maintain good fiber alignment and uniform ply thickness at elevated temperatures. Suitable vacuum pressure balances the stability of the preform and the ability to deform the preform to the desired shape. In one embodiment, the vacuum pressure between the diaphragms is set to less than 1 atmosphere, preferably less than 800 mbar, for example, 500 mbar.

The term "vacuum pressure" as used herein includes vacuum pressures of less than 1 atmosphere (or less than 1013 mbar).

Next, heating is carried out to enable softening of the binder within the preform. Heating may be done, for example, by placing the assembly of diaphragms and tool housing in an oven, or by using an array of infrared heating lamps or a heated mat. The binder in the preform, which is in a solid phase at ambient temperature (20° C.-25° C.), softens upon heating and allows the fibrous plies to be formed. The forming temperature is dictated by the viscosity of the binder between plies of fibrous material in the preform. The viscosity of the binder is optimized to reduce the shear stress within the preform so as to allow movement of the plies without creating fibre distortion and/or wrinkles. The binder that is suitable for the purpose herein contains a blend of thermoset resin and thermoplastic resin, and may represent less than 20% of the preform mass, preferably less than 10% of the preform mass, more preferably, in the range of 2%-6% of the preform mass. In certain embodiments, the binder composition contains sufficient thermoplastic content to enable successful deformation at elevated temperatures and may be delivered in a powder form. The minimum deforming temperature is the temperature at which the binder is softened to a molten state that allows the fibrous preform plies to deform. The preferred binder viscosity at this stage may be below 100,000,000 m·Pas, preferably below 10,000,000 m·Pa, more preferably below 3,000,000 m·Pa. Once the preform has reached an optimum deforming temperature, the tool housing is evacuated at a predetermined rate of 1 mbar/15 min or faster, until the housing has reached the desired vacuum level of less than 980 mbar absolute pressure but less than vacuum pressure in the tool housing, more preferably, less than 900 mbar absolute pressure and ideally less than 850 mbar absolute pressure, heating is maintained through the entire deformation time. As the tool housing is being evacuated, the diaphragms with the preform sandwiched there between are pulled towards the mold and conformed to the shape of the mold surface.

Upon reaching the desired vacuum level of the tool housing, the vacuum pressure between the diaphragms is reduced to a vacuum level lower than that between the tool housing to ensure full compaction of the preform. This also enables the operator to tailor the preform compaction, and consequently, the handling and permeability characteristics of the preform. At this point, the preform is cooled.

The shaped preform is then cooled to below the softening temperature of the binder. At this point, the binder in the preform re-stiffens and the preform retains its newly formed geometry. Upon reaching the cooed temperature, the vacuum between the diaphragms is relieved by venting to atmosphere, the upper diaphragm is lifted away from the lower diaphragm while maintaining vacuum inside the sealed chamber between the lower diaphragm and the housing, and the shaped preform is removed (FIG. 1D). Air is then re-introduced into the tool housing, and the vacuum forming process is ready to be repeated. The removed preform will hold its desired shape for subsequent resin infusion.

The double-diaphragm arrangement described above aids in the deformation of fibrous preforms by enabling a lowered compaction pressure to be set between the diaphragms, thereby increasing the mobility of adjacent plies across each other due to lower frictional forces. A reduced pressure between the two diaphragms also minimizes the frictional contact force so that the diaphragms can stretch independently of the preform. In the vacuum forming process disclosed herein, complete compaction to the desired radius shape can be achieved once the full vacuum level in the tool housing has been applied after deforming. The ability to control the level of compaction in forming, the rate of forming and the shear behaviour of the binder leads to an improved radius geometry.

The vacuum forming process described above does not require a complex tool with matching upper and lower molding parts. Instead, the vacuum forming process relies on controlling the vacuum pressure, temperature and deformation speed. The vacuum rate between the diaphragms and within the tool housing can be optimized to avoid the formation of excessive wrinkles, fibre distortion and to control radius thickness.

Conventionally, post-cure machining of the structural parts is done to achieve the final part geometry. An 8-axis milling machine is generally used for such operations. This phase of the manufacturing process presents a high level of risk because it is one of the last processing steps to be performed. Damage caused during this stage can result in the part being scrapped. Furthermore, the operation is also generally very time-consuming.

Thus, the fabrication of the shaped preform can be further optimized by the inclusion of a machining step after the manufacture of the preform blank, but before shaping via the vacuum forming process described above. This ensures that efficient and easy machining can be done in an automated fashion rather than advanced programming and positioning of the 3-dimensional preform within a complex machine if post-cure machining is done. This machining step can be achieved through pre-consolidation of the flat preform blank to a desired compaction level for stabilization and edge quality.

Figure 2B:
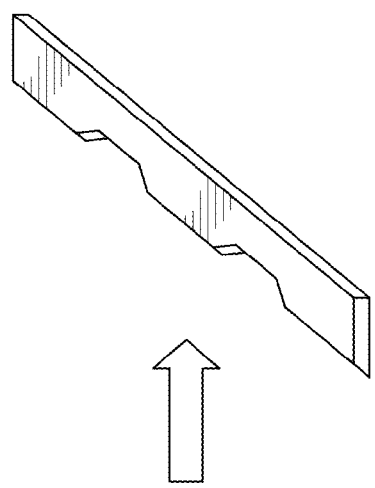
Figure 2A:
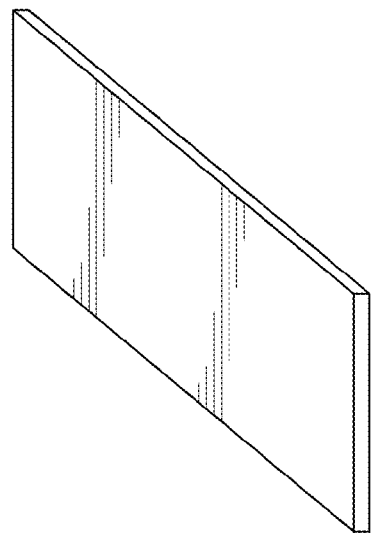

FIGS. 2A-2C illustrates a method for fabricating a shaped preform with an intermediate machining step. Referring to FIG. 2A, a large flat sheet of preform material (i.e. preform blank) is manufactured by laying up a plurality of fibrous layers that are either consolidated at the point of lay-down or followed by compaction or consolidation. The preform sheet is then cut to a desired pattern by machining, see FIG. 2B. Referring to FIG. 2C, the patterned sheet is then shaped via the vacuum forming process described above to produce a non-planar, three-dimensional configuration, for example, a structure with L-shaped cross-section. The final geometry of the shaped preform depends on the mold configuration that is used.

The vacuum forming process described herein allows effective and efficient production of 3-dimensional preforms in an automated fashion, which in turn allows greater part repeatability and large-scale manufacturing. As an example, this process is suitable for the manufacture of aerospace stiffening structures such as curved L-shaped sections of stringers for wing skins, C-shaped or U-shaped wing spars. Moreover, rapid deformation is possible via this vacuum forming process, for example, 5-15 minute cycle for deforming a flat preform blank consisted of 33 plies of carbon fiber fabrics containing 5% by weight of binder into an L-shaped or U-shaped structure.

Preform Material

The preform in the present context is an assembly of dry fibers or layers of dry fibers that constitute the reinforcement component of a composite, and is/are in a form suitable for resin infusion application such as RTM.

The flat preform blank to be shaped consists of multiple layers or plies of fibrous material, which may include non-woven mats, woven fabrics, knitted fabrics, and non-crimped fabrics. A "mat" is a nonwoven textile fabric made of randomly arranged fibers, such as chopped fiber filaments (to produce chopped strand mat) or swirled filaments (to produce continuous strand mat) with a binder applied to maintain its form. Suitable fabrics include those having directional or non-directional aligned fibers in the form of mesh, tows, tapes, scrim, braids, and the like. The fibers in the fibrous layers or fabrics may be organic or inorganic fibers, or mixtures thereof. Organic fibers are selected from tough or stiff polymers such as aramids (including Kevlar), high-modulus polyethylene (PE), polyester, poly-p-phenylene-benzobisoxazole (PBO), and hybrid combinations thereof. Inorganic fibers include fibers made of carbon (including graphite), glass (including E-glass or S-glass fibers), quartz, alumina, zirconia, silicon carbide, and other ceramics. For making high-strength composite structures, such as primary parts of an airplane, the preform fibers preferably have a tensile strength of ≥3500 MPa (or ≥500 ksi).

To form the preform blank according to one embodiment, the binder composition is applied to each fibrous layer (e.g. fabric ply), and a plurality of coated fibrous layers are then assembled by stacking to a desired thickness. The binder may be applied to the fibrous layers prior to or during the layup of the fibrous layers. The assembly of the fibrous layers may be done by a hand layup process or an automated layup process such as automated tape laying (ATL) and automated fiber placement (AFP) or other automated methods of depositing the fibres or plies in a broad good or pre-prepared form. The stack of fibrous layers is then consolidated or compacted by applying heat and pressure. When automated layup is utilized, the compaction is conducted during layup. During compaction, the binder which is a solid at room temperature softens upon heating and allows the fabric plies to bind to each other as a consolidation pressure is applied. Some binders require the maintenance of the consolidation pressure while the binder cools.

Binder System

The binder for bonding the fibrous layers in the preform blank may be in various forms, including powder, spray, liquid, paste, film, fibers, and non-woven veils. The binder material may be selected from thermoplastic polymers, thermoset resins, and combinations thereof. In certain embodiments, the binder may take the form of polymeric fibers formed from thermoplastic material or thermoset material, or a blend of thermoplastic and thermoset materials. In other embodiments, the binder is a mixture of thermoplastic fibers (i.e. fibers formed from thermoplastic material) and thermoset fibers (i.e. fibers formed from thermoset material). Such polymeric fibers may be incorporated into the preform blank as a non-woven veil composed of randomly-arranged polymeric fibers to be inserted between fibrous layers of the preform.

As an example, the binder material may be an epoxy resin in a powder form. As another example, the binder material may be a blend of one or more thermoplastic polymers and one or more thermoset resins in a powder form. As another example, the binder material is a non-woven veil composed of thermoplastic fibers.

If applied in spray form, the binder material may be suitably dissolved in a solvent such as dichloromethane. When solvent is used, subsequent removal of the solvent is required. In film form, a binder resin composition may be deposited (e.g. by casting) onto a release paper to form a film, which is then transferred to the fibrous layer of the preform. In powder form, the binder may be scattered onto the fibrous layer. When non-woven veil of polymeric fibers is used as binder material, each veil is inserted between adjacent fibrous layers during the laying up of the preform.

Preferably, the amount of binder in the fibrous preform is equal to or less than about 20% by weight based on the total weight of the preform, preferably, 0.5%-10% by weight, more preferably, 0.5%-6% by weight.

In a preferred embodiment, the binder is a resin composition that is void of any catalyst, curing or cross-linking agent which might be activated at the preform fabrication temperature (e.g. temperatures during layup and shaping), and yet it is inherently thermally stable at the preform fabrication temperature.

The thermoplastic material suitable as binder material includes one or more thermoplastic polymers selected from polyester, polyamide, polyimide, polycarbonate, polyurethane, poly(methyl methacrylate), polystyrene, polyaromatics, polyesteramide, polyamideimide, polyetherimide, polyaramide, polyarylate, polyacrylate, poly(ester) carbonate, poly(methyl methacrylate/butyl acrylate), polysulphone, copolymers and combinations thereof.

In one embodiment, the thermoplastic material is a polyarylsulphone polymer having arylsulphone units represented by:

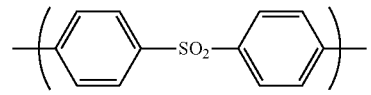

Preferably, the polyarylsulphone polymer has an average molecular weight (Mn) in the range of 2,000-20,000. The polyarylsulphone polymer may also have reactive end groups such as amine or hydroxyl that are reactive to epoxide groups or a curing agent. Suitable polyarylsulphones include polyethersulphone (PES), polyetherethersulphone (PEES), and a copolymer thereof (PES-PEES). A particularly suitable polyarylsulphone polymer is a PES-PEES copolymer with terminal amine groups.

The thermoset material suitable as binder material may be selected from the group consisting of epoxy resin, bismaleimide resin, formaldehyde-condensate resins (including formaldehyde-phenol resin), cyanate resin, isocyanate resin, phenolic resin, and mixtures thereof. The epoxy resin may be mono or poly-glycidyl derivative of one or more compounds selected from the group consisting of aromatic diamines, aromatic monoprimary amines, aminophenols, polyhydric phenols, polyhydric alcohols, and polycarboxylic acids. Particularly suitable are multifunctional epoxy resins, including di-functional, tri-functional, and tetra-functional epoxies.

According to one embodiment, the binder is a resin composition containing one or more multifunctional epoxy resins and a polyarylsulphone polymer with reactive end group(s), and has a softening point of approximately 80° C.-90° C.

It has been found that certain combinations of thermoplastic polymer and thermoset resin(s) operate with synergistic effect with regard to the flow control and flexibility of the blend. The thermoplastic component serves to provide flow control to the blend, dominating the typically low viscosity thermoset resins, and ensuring that the binder preferentially wets the surface of fibers in the preform. The thermoplastic component also provides flexibility to the blend, dominating the typically brittle thermoset resins.

The binder in the preform is suitable for use with a wide variety of matrix resins to be injected into the preform by liquid resin infusion techniques, such as RTM. Moreover, the binder is selected to be chemically and physically compatible with the matrix resin to be injected into the preform.

When the dry preform is used in a resin injection process such as RTM, it is desirable that the binder does not form an impermeable film at the surface of the fibrous layers, which may prevent the matrix resin from satisfactorily penetrating through the thickness of the preform material during the resin injection cycle.

The following example is provided for illustrating a method of shaping a preform according to an embodiment of the vacuum forming process described herein. This example is for illustration purposes only, and is not to be construed as limiting the scope of the appended claims.

EXAMPLE

A flat preform blank (600×200 mm) was formed by laying up 33 plies of carbon-fiber fabrics. Prior to laying up, a powder scattering method was used to deposit 5 gsm of a resin binder in powder form onto each side of the fabric ply. The fabric plies with the scattered powder thereon were laid up and pressed together using heat and pressure where the dry stack of ply's were compacted under atmospheric pressure through the application of a vacuum, and then heated to 130° C. for 15 mins prior to being cooled to room temperature and the vacuum consolidation removed. This is called a preforming step.

This binder contains a mixture of multifunctional epoxy resins and a PES-PEES copolymer, and has a softening point at around 90° C.

Figure 3:
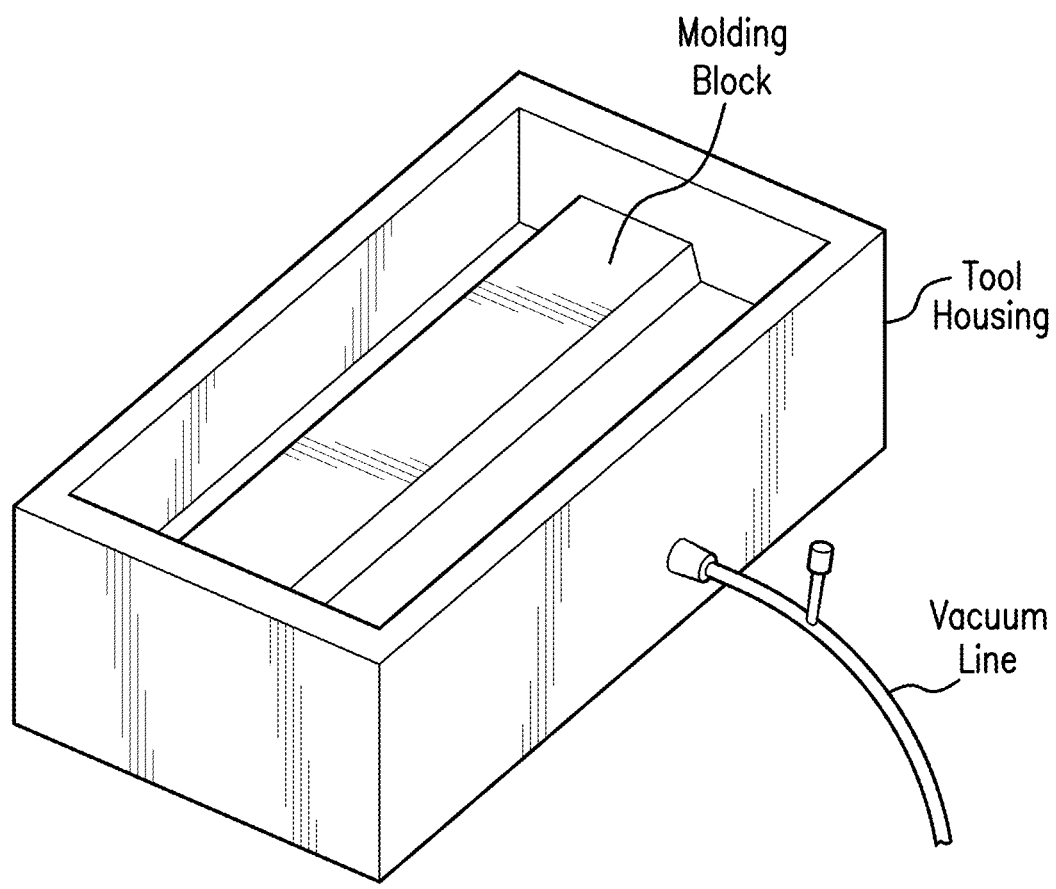
FIG. 3 shows a tool housing containing a mold for shaping a preform according to one example.
Figure 4:
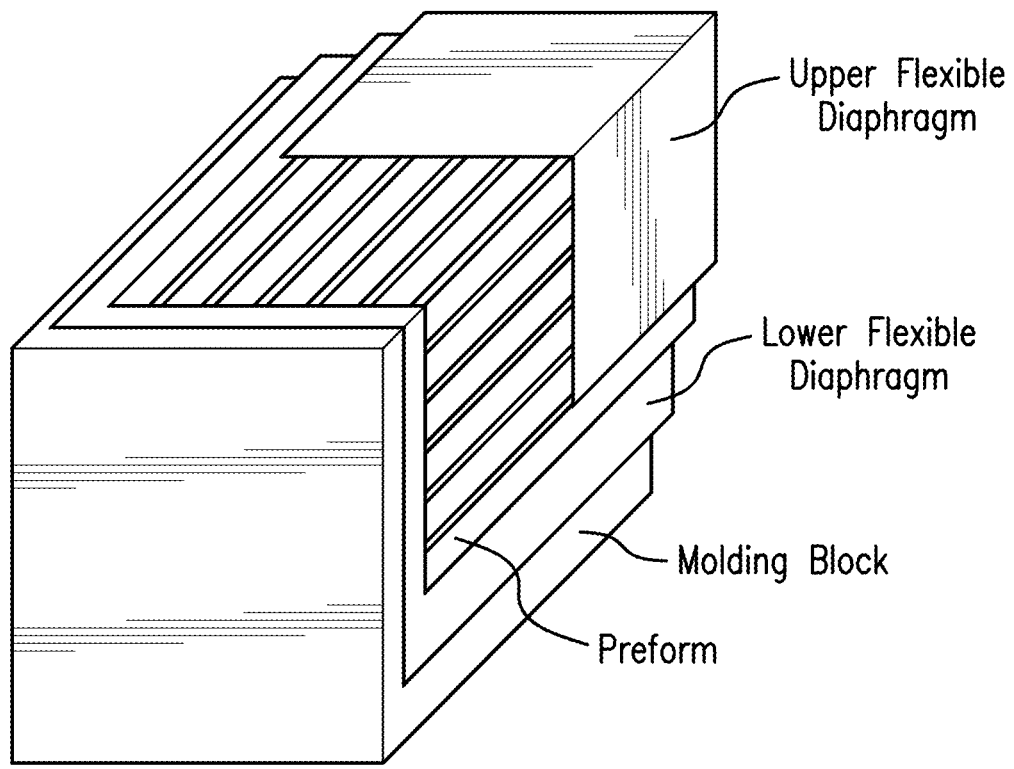
FIG. 4 illustrates the set-up for forming a preform with an L-shaped cross-section.

The flat preform blank was consolidated according to the preforming process described above. The set-up includes a tool housing containing a molding block, see FIG. 3, and two flexible sheets (upper and lower diaphragms) made of silicone rubber. This set-up was used to form a shaped preform with an L-shaped cross-section, and is illustrated by FIG. 4. Such preform configuration is suitable for making a stringer section in the wing of an airplane.

Initially, the diaphragms with the flat preform sandwiched there between were placed on the tool housing. The diaphragm frame was clamped to the perimeter of the tool housing, thereby creating a vacuum tight seal bounded by the lower diaphragm and the tool housing and a sealed pocket between the upper and lower diaphragms.

Next, air was removed from between the upper and lower diaphragms via the application of a vacuum source until the vacuum pressure has reached 500 mbar. At that point, the preform blank was firmly supported by both diaphragms.

The tool set-up was then placed in an oven and heated to 140° C. at a rate of 5° C./min. During heating, the tool housing was open to atmospheric pressure to ensure no air expansion within the chamber.

Once the preform temperature had reached 140° C., the tool housing was evacuated. Air was removed at the rate of 100 mbar/min until the vacuum pressure in the tool housing was below 10 mbar. At such time, the diaphragms together with the preform were pulled toward the mold surface and eventually conformed thereto. Heating was maintained during this entire time.

Upon full vacuum in the tool housing (below 10 mbar), the pressure between the diaphragms was reduced until stable, at vacuum pressure below 10 mbar. At that point, the heating was turned off, and the preform was allowed to cool. Vacuum in the tool housing was maintained below 10 mbar during cooling.

When the preform was cooled to 40° C., the vacuum between the diaphragms was relieved by venting to atmosphere, and the upper membrane was lifted. The shaped preform was subsequently removed from the tool set-up. After the shaped preform was removed, air was re-introduced into the tool housing.

Figure 5:
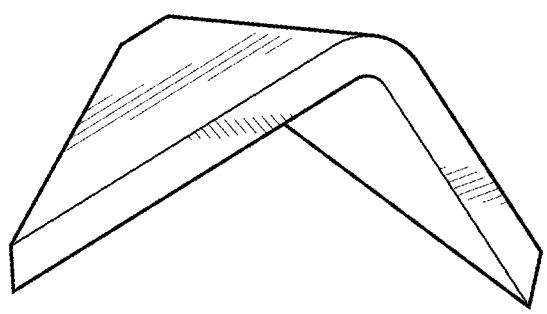
FIG. 5 shows a shaped preform representing a stringer section that was produced by implementing the set-up illustrated in FIG. 4.

The resulting preform is shown in FIG. 5. It has a curved L-shape section with a radius of curvature of 8.5 m over its length.

The cycle time for the shaping process of the pre-consolidated flat preform was 15 minutes—from the start of heating the flat preform blank until the final shape was established.

What is claimed is:

1. A method for shaping a fibrous preform comprising:
   (a) providing a substantially flat fibrous preform, said fibrous preform comprising of an assembly of fibrous materials bonded to each other by a resin binder;
   (b) providing an upper flexible diaphragm and a lower flexible diaphragm, said diaphragms being formed of an elastomeric material and are impermeable to gas;
   (c) providing a housing with a mold positioned therein, said mold having a non-planar molding surface;
   (d) holding the fibrous preform between the upper and lower diaphragms in an air-tight manner by creating a sealed pocket between the diaphragms;
   (e) positioning the diaphragms with the preform there between over the housing so as to define a sealed chamber bounded by the lower diaphragm and the housing, and such that the lower diaphragm is positioned above the molding surface;
   (f) removing air from between the diaphragms to establish a vacuum pressure of less than 950 mbar and less than the pressure in the housing;
   (g) heating the fibrous preform to a temperature above the softening point of the resin binder;
   (h) creating a vacuum inside the sealed chamber between the lower diaphragm and the housing by removing air at a rate of 1 mbar/15 mins or faster until a vacuum pressure of 950 mbar or below is reached, while heating is maintained, whereby the diaphragms with the preform there between are pulled toward the molding surface and eventually conform thereto, thereby forming a shaped preform;
   (i) reducing the vacuum pressure between the diaphragms to 10 mbar or below;
   (j) cooling the shaped preform to a temperature that is below the softening temperature of the resin binder;
   (k) relieving the vacuum from between the diaphragms;
   (l) removing the upper diaphragm from the cooled preform while maintaining vacuum inside the sealed chamber between the lower diaphragm and the housing; and
   (m) removing the cooled, shaped preform from the lower diaphragm.

2. The method of claim 1, wherein the heating step (g) is carried out until the viscosity of the resin binder is in the range of less than $1.0 \times 10^8$ m·Pa.

3. The method of claim 1, wherein the total amount of resin binder in the fibrous preform is from 0.5% to 10% by weight based on the total weight of the fibrous preform.

4. The method of claim 1, further comprising machining the substantially flat fibrous preform according to a pattern prior to step (d).

5. The method of claim 1, wherein said fibrous preform comprises of a plurality of fibrous layers laid up in a stacking arrangement, and the resin binder is applied to at least one surface of each fibrous layer.

6. The method of claim 5, wherein said fibrous layers are layers of fabric, tapes or tows.

7. The method of claim 1, wherein the resin binder comprises a thermoplastic component or a thermoset component, or both.

8. The method of claim 7, wherein the resin binder comprises a thermoplastic component and a thermoset component, and thermoplastic component comprises a polyarylsulphone polymer and the thermoset component comprises one or more epoxy resins.

9. The method of claim 8, wherein the polyarylsulphone polymer is a copolymer of polyethersulphone (PES) and polyetherethersulphone (PEES) with terminal amine groups.

10. The method of claim 1, wherein the resin binder comprises a thermoplastic polymer selected from: polyester, polyamide, polyimide, polycarbonate, polyurethane, poly(methyl methacrylate), polystyrene, polyaromatics, polyesteramide, polyamideimide, polyetherimide, polyaramide, polyarylate, polyacrylate, poly(ester) carbonate, poly(methyl methacrylate/butyl acrylate), polysulphone, copolymers and combinations thereof.

11. The method of claim 1, wherein the resin binder is in the form of a powder, liquid, paste, or film.

12. The method of claim 1, wherein the resin binder is in the form of polymeric fibers, which are a mixture of thermoplastic fibers and thermoset fibers, or are fibers formed from a blend of thermoplastic and thermoset polymers.

13. The method of claim 1, wherein the resin binder is in the form of polymeric fibers, which are formed from a blend of thermoplastic and thermoset polymers.

14. The method of claim 1, wherein the resin binder is in the form a nonwoven veil comprised of randomly arranged polymeric fibers, which are formed of one or more polymers selected from thermoplastic polymers, thermoset polymers, and combinations thereof.

15. The method of claim 1, wherein the fibrous materials comprise fibers of a material selected from: aramid, high-modulus polyethylene (PE), polyester, poly-p-phenylene-benzobisoxazole (PBO), carbon, glass, quartz, alumina, zirconia, silicon carbide, and combinations thereof.

* * * * *